INVENTORS
LAUREN W. GATES
LEWIS W. SCHMIDT
BY
Owen, Wickersham & Erickson
ATTORNEYS United States Patent Office 3,436,902
Patented Apr. 8, 1969

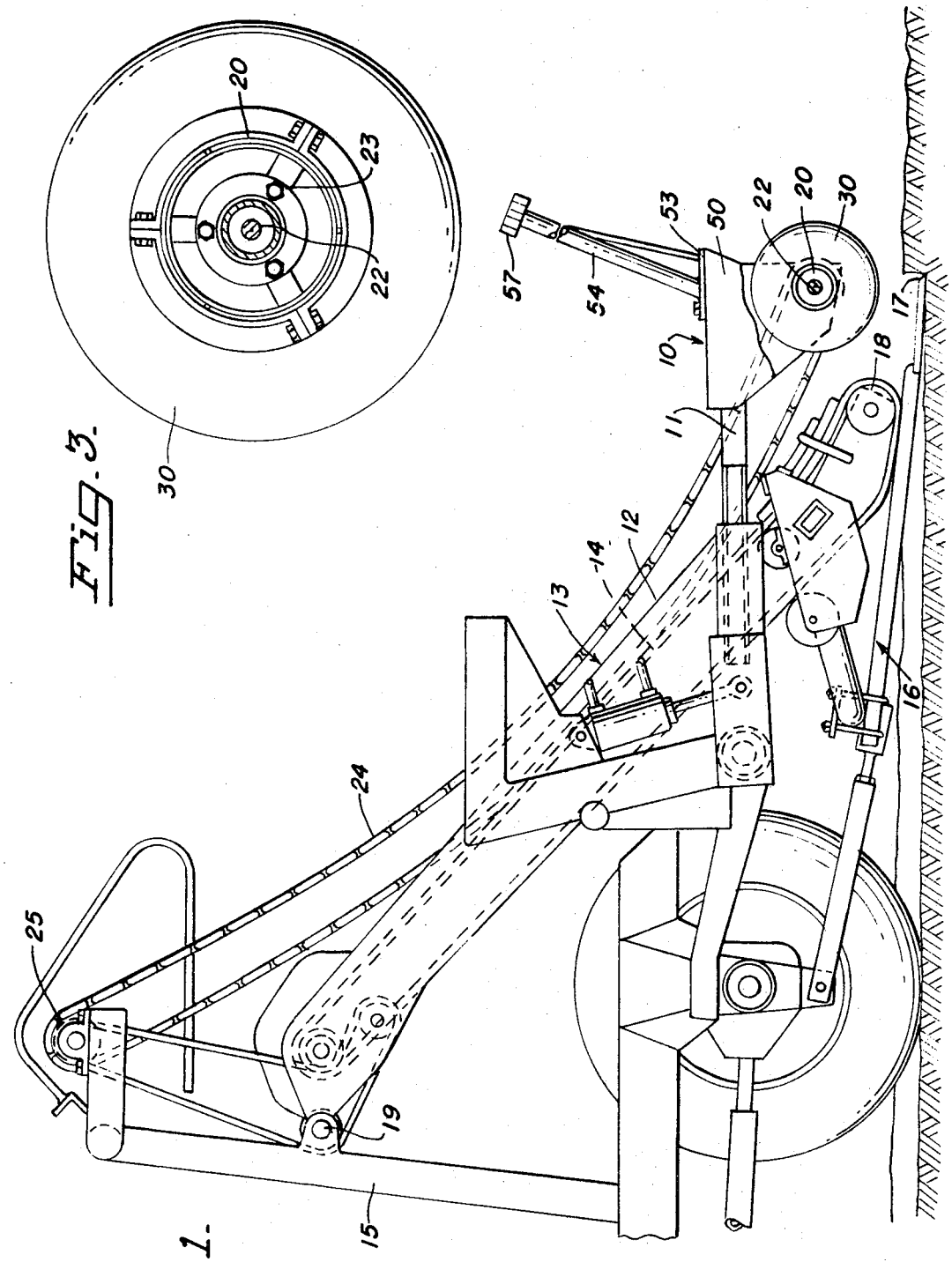

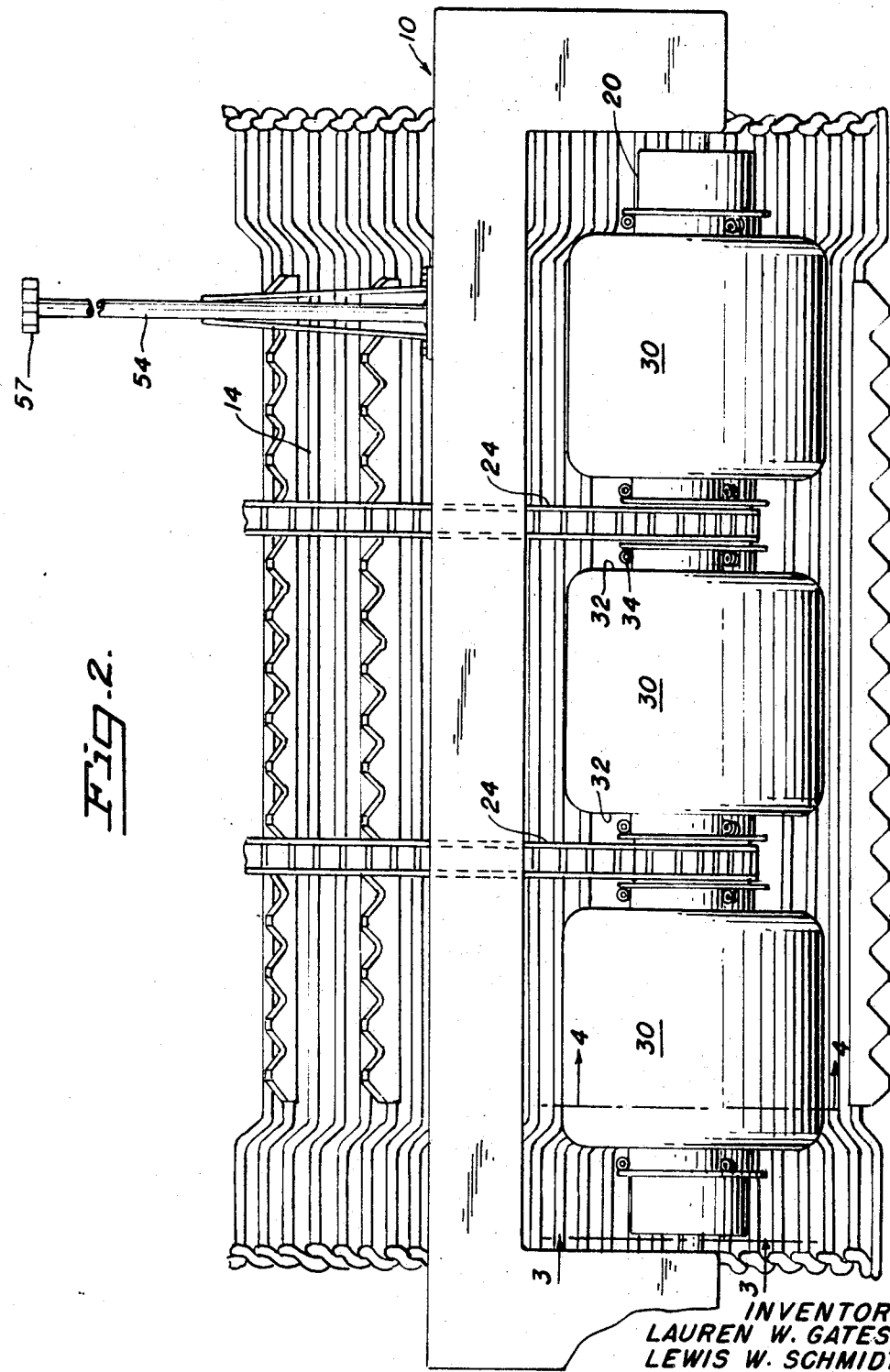

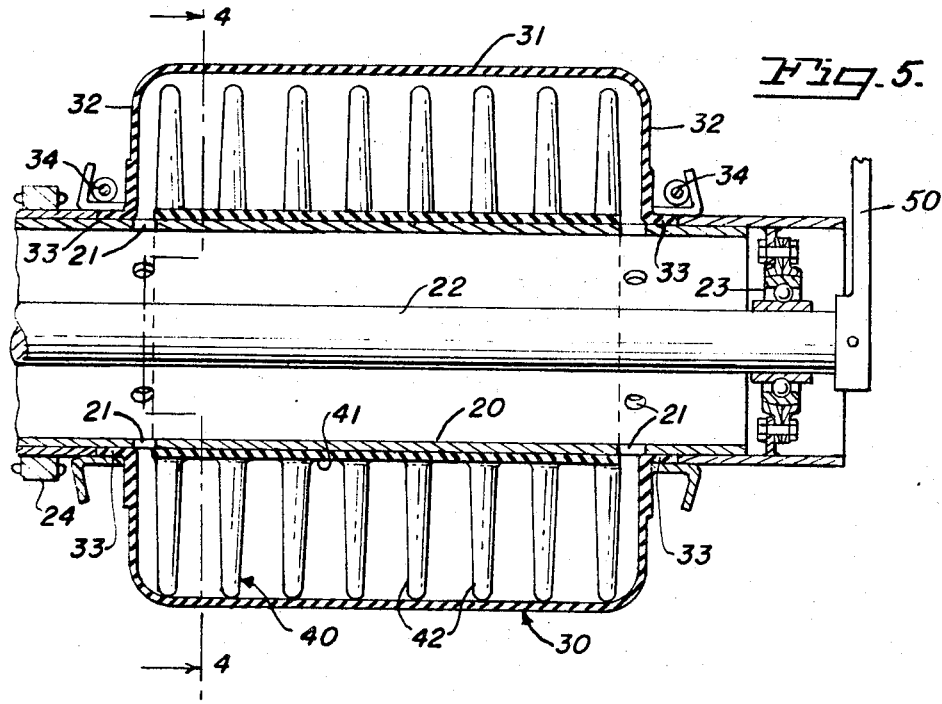
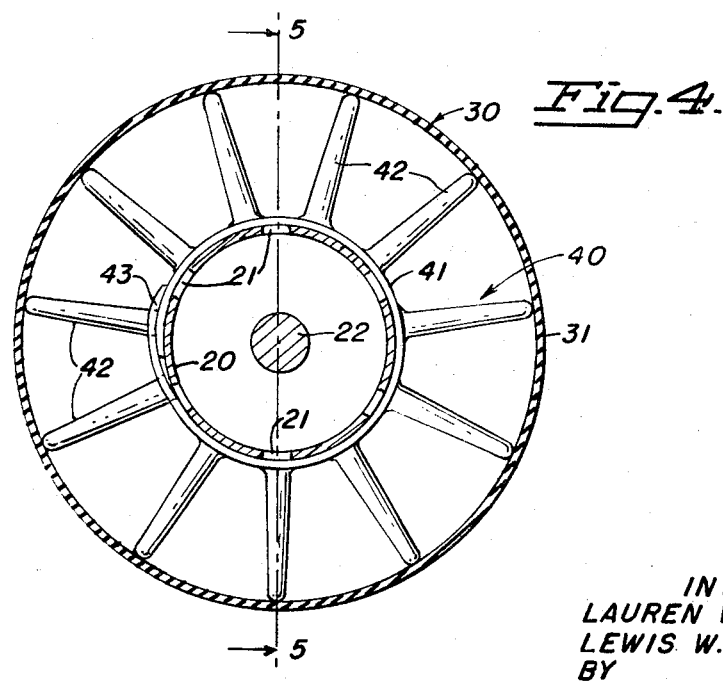

3,436,902
TOMATO HARVESTER PICKUP
Lauren W. Gates, Stockton, and Lewis W. Schmidt, Rio Vista, Calif., assignors to the Regents of the University of California, Berkeley, Calif.
Filed Sept. 15, 1966, Ser. No. 579,663
Int. Cl. A01d 45/00, 31/00, 33/02
U.S. Cl. 56—327                                          10 Claims This invention relates to improvements in tomato harvesters and, more particularly, to improvements in the pickup mechanism for tomato harvesters, whereby severed tomato plants are raised from the ground and conveyed to a shaking mechanism. The invention may be considered as an improvement over the invention shown in application Ser. No. 345,738 filed Feb. 18, 1964, now abandoned, and it relates especially to improvements in the assist mechanism positioned above the main pickup conveyor to aid in placing the tomato plants on the main conveyor.

Application Ser. No. 345,738 shows a pickup mechanism which has been very successful in tomato harvesting. It incorporated an assist mechanism which comprised a rotating device set above the front of the pickup elevator; so that the tomato plants passed in between the top of the elevator front end and the bottom of the assist mechanism, which kept them from falling back onto the ground.

We have now found that the assist mechanism can be substantially improved, and that is the main purpose of the present invention. The former assist mechanism, in its illustrated form, had a series of radial flaps which were rotated around an axis. In their place, the present invention utilizes a continuous drum so that there is contact at all points and not merely at isolated points. To prevent damage to tomatoes, our new device provides for the drum to yield when it engages tomatoes, rather than crushing or breaking them. This is accomplished in the present invention by a novel arrangement wherein the drum yields readily and yet recovers its shape at once after the pressure on it is removed.

In the present invention a hollow rotatable shaft journaled in an assist frame has mounted on it a plurality of hollow rubber drums, inside of which are resilient support means. Air passage means through the tubular shaft enables the hollow drum to collapse and to recover without exerting either a vacuum or air pressure on a confined air mass. When rotated, these drums help to propel the plants into the machine while yet yielding to a plant portion such as the tomatoes themselves, which would require protection.

Another feature of the invention is a different and improved mounting of the assist mechanism enabling easy adjustments by an operator and enabling him to lift it out of the way more easily for any purpose which may be desired.

Other objects and advantages of the invention will appear from the following description of a preferred form.

In the drawings:

FIG. 1 is a fragmentary view in side elevation and partly broken away and shown in section of the front end of a tomato harvester embodying the principles of the present invention and showing the pickup elevator, its mounting frame, and a novel assist mechanism.

FIG. 2 is a fragmentary view in front elevation, with some portions broken away, of the lower part of the assist mechanism and pickup unit. The handle assembly is broken to conserve space.

FIG. 3 is an enlarged view in section taken along the line 3—3 in FIG. 2.

FIG. 4 is an enlarged view in section taken along the line 4—4 in FIG. 2.

FIG. 5 is a view in section through one of the drums taken along the line 5—5 in FIG. 4.

Figure 6:
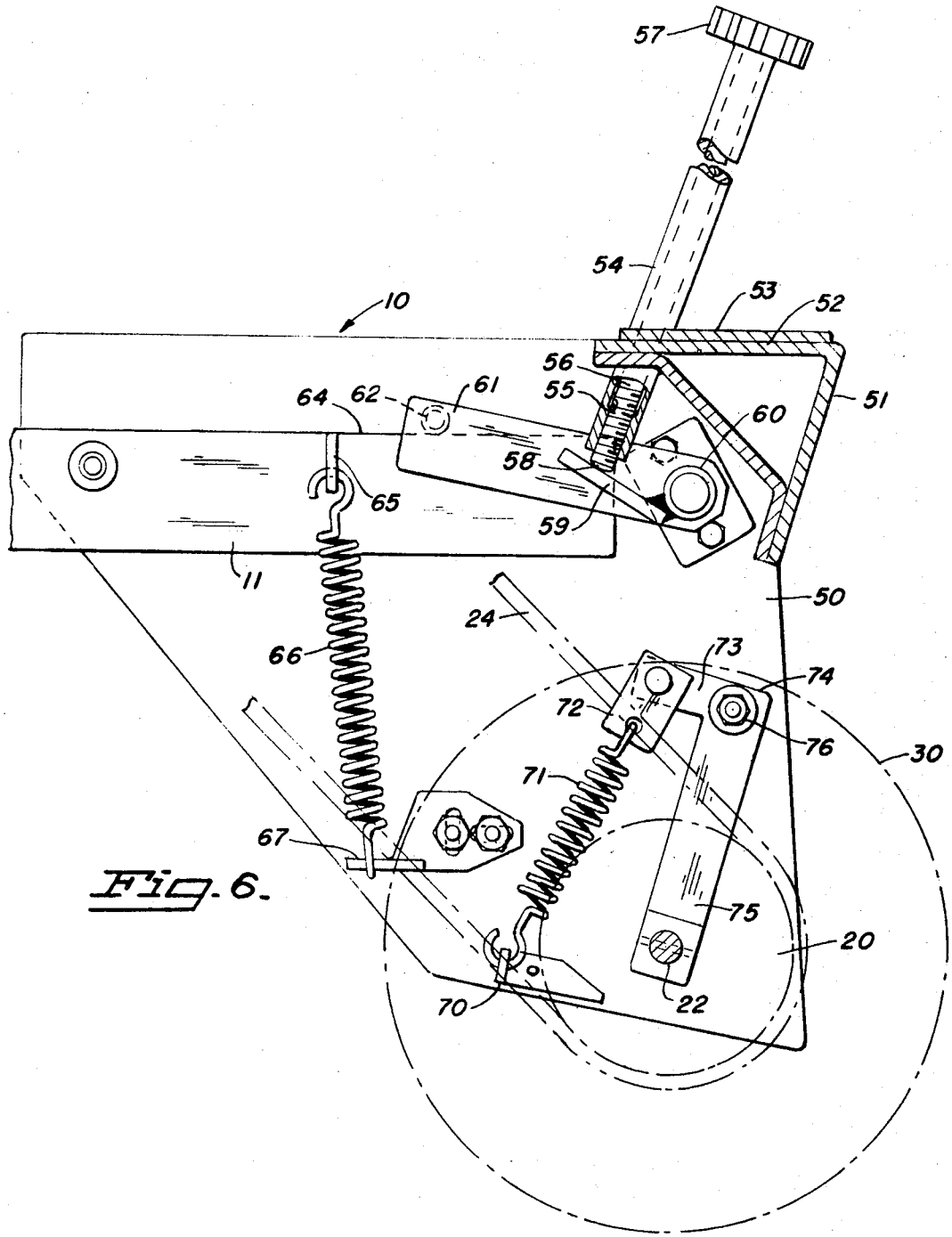
FIG. 6 is a fragmentary enlarged view in elevation and in section taken along the line 6—6 in FIG. 2 and showing the assist frame.

The assist mechanism of the present invention includes an assist frame 10 which is pivotally mounted to a pair of forwardly extending side bars 11 extending forwardly from the pickup frame 12 of a tomato harvester pickup mechanism 13. The pickup mechanism is exactly the same as that described in pending application Ser. No. 345,738 filed Feb. 18, 1964. It includes a flighted conveyor 14 which moves upwardly on its upward flight and downwardly on its lower flight. The frame 12 is pivoted to the main frame 15 of the harvester by pivot means 19 and is connected to a cutting assembly 16 which preferably moves a blade 17 slightly underground to cut the stems of the tomato plants.

The assist frame 10 is mounted above the forward end 18 of the pickup unit 13 and has journaled to it a hollow rotatable shaft 20 which has a series of air openings 21 through it. The rotatable shaft 20 is supported by means of a fixed through shaft 22 and bearings 23 so that it is easily rotated when driven, as by belts or chains 24, which are themselves driven from upper sprockets 25 mounted on the upper end of the harvester frame 15, as shown in FIG. 1. The driving mechanism may be the same as for the assist mechanism in patent application Ser. No. 345,738. No sprockets need be provided on the shaft 20, for friction drive is sufficient.

A plurality of assist drums 30 are spaced along and mounted to the shaft 20. Each drum 30 has a generally cylindrical center portion 31 and a pair of annular flat end portions 32 with a pair of short cylindrical portions 33 of approximately the same diameter as the shaft 20. The portions 33 are secured to the shaft 20 by clamps 34 so that they rotate with the shaft 20. The drums 30 are spaced apart, and in between drums the driving chains or belts 24 cause rotation by engaging annular segmented wear rings 35, also clamped to the shaft 20 by the clamps 34. These drums 30 are made of a suitable elastomer, such as rubber or neoprene, and are made with walls sufficiently thick to avoid injuries but sufficiently thin so that they themselves give readily; in fact, it is preferable that they require some support in order to retain their generally cylindrical shape.

This support may be given by a resilient support means 40, which may be made as a flat elastomeric molding formed into a cylinder and secured to itself. Thus, as shown in FIGS. 4 and 5, the support means 40 may have a shaft engaging mat 41, which in its assembled form is cylindrical but which may be molded flat; being made from elastomer, the mat 41 is easily looped into the cylindrical shape shown. Projecting from the mat 41 is a series of narrow flexible fingers 42 which readily yield but which normally assume the straight radial position illustrated here, and the length of the fingers 42 is such that they normally snugly engage the drum portion 31, preferably being a little longer than would be necessary for touching, so that their engagement is quite snug. The mat 41 may have a series of openings 43 at one end through which the fingers 42 at the other end can be inserted, as shown in FIG. 4, in order to lock the unit 40 into its cylindrical shape. Thus, the assist assembly has the series of drums 30 and in each drum 30 is one of the supporting units 40 with its fingers 42 engaging the drum portion 31.

It is important to prevent a buildup of air pressure or vacuum inside the drums 30, and for this purpose the hollow shaft 20 has the openings 21 located at each end of each drum 30, spaced apart slightly further than the length of the mat 41, so that when the supporting mat 41 overlies the shaft 20, it cannot cut off the air openings at both ends, which are both inside the drum 30. As shown in FIG. 5, the air openings 21 at both ends are about half open, and if the mat 41 were to be moved toward either side, it would simply open one set of openings 21 while closing the other set. This assures maintenance of air communication from inside each drum 30 to atmosphere, and this in turn means that when an object engages any drum 30, the surface 31 will tend to move in, to collapse somewhat at that point, and this is done freely without any opposing air pressure; also when the object leaves it, the original drum shape is resumed without any opposing vacuum.

The means by which the position of the drums 30 relative to the elevator 13 may be adjusted and by which the drum 30 is supported is shown in FIG. 6. The assist frame 10 has two parallel side plates 50 and a delta-shaped cross member 51 at the front with a flat top plate 52, which may have a reinforcing plate 53. To this flat plate 53 is welded a tube 54 having interior threads 55 at its lower end, and in this tube 54 is a threaded member 56 with a handle 57 at its upper end. A lower end 58 of the threaded member 56 projects beyond the tube 54 and engages a cam plate 59, which is welded to a rock shaft 60 that is pivoted to a frame side member 50; each of a pair of bars 61, secured to the rock shaft 60, has a pair of rollers 62 thereon. These rollers 62 engage the upper surfaces of side bars 64 on the side bars 11, which may be considered part of the elevator frame 12. The side bars 11 have an anchor 65 for a spring 66, the other end of the spring 66 being anchored to a bracket 67. The bracket 67 is secured to a side plate 50 by means of slotted openings and bolts to enable adjustment of the spring tension. Thus, by turning the handle 57, an operator can adjust the height of the assist drums 30 relative to the pickup 13. By lifting the handle 57 he can pull up the frame 10 and all its parts.

On each of the side plates 50 is pivotally mounted a bell crank 74 in which is secured the shaft 22, and to this are mounted the bearings 23 that support the rotating hollow shaft 20. Each side plate 50 is provided with a bracket 70 to which a spring 71 is anchored. The other end of the spring 71 is secured to a bracket 72 which is secured to an arm 73 of the crank 74 whose radial arm 75 supports the shaft 22. The crank 74 is pivoted to the side plate 50 by a pivot 76. The spring 71 maintains the needed pressure on the belt or chain 24 to keep it taut.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An assist mechanism for a tomato harvester pickup and the like having a frame and elevator means at the front end of said pickup, said elevator means having a forward end, comprising
    assist frame means secured to said frame,
    a rotatable shaft supported by said assist frame adjacent said forward end and having air passage means therethrough,
    a plurality of hollow rubber drums mounted along said shaft for rotation therewith, their interior being connected to said air passage means,
    resilient support means mounted to said shaft inside each drum and flexible drum supporting means projecting in engagement with said drum, and
    means for rotating said shaft.

2. The assist mechanism of claim 1 having means for adjusting the gap between said drums and said elevator means.

3. The assist mechanism of claim 2 having means enabling the harvested crop to push said assist frame means up about a pivot to enlarge said gap temporarily up to a pre-set maximum amount.

4. The assist mechanism of claim 2 having said assist frame means pivotally mounted with regard to said frame, first stop means providing a normal gap between said drums and said elevator means, second stop means providing a maximum gap therebetween, and means for lifting said assist frame means on said pivot from said first stop means to said second stop means.

5. An assist mechanism for a tomato harvester pickup and the like, wherein said pickup has a frame and a continuously moving elevator means at the front end of said harvester pickup, said elevator means having a forward end, comprising
    assist frame means secured to said frame,
    a tubular hollow rotatable shaft journaled in said assist frame near said forward end and having air passage means therethrough,
    a plurality of hollow rubber drums mounted along said shaft for rotation therewith, their interior being connected to said air passage means,
    a resilient support means mounted to said shaft inside each drum having a shaft-engaging mat and drum supporting flexible means projecting from said mat into engagement with said drum, and
    means for rotating said shaft.

6. The assist mechanism of claim 5 having said assist frame means pivotally mounted to said frame and having first stop means supporting said shaft and drums by gravity at a normal operating gap from said elevator means, and second stop means limiting enlargement of the gap.

7. The assist mechanism of claim 5 wherein said resilient support means comprises a flexible said mat having a flat lower surface and a series of projecting fingers comprising said flexible means and a row of openings at one end through which one row of said fingers can be pushed through and locked to hold said mat around said shaft.

8. A tomato harvester pickup and the like comprising
    a frame, and
    a continuously moving elevator means at the harvester front end, having its own front end,
    assist frame means secured to said frame,
    a tubular hollow shaft mounted rotatably to said assist frame and having a series of radial openings therethrough and open at its ends, for passage of air,
    a plurality of hollow rubber drums disposed along said shaft for rotation therewith,
    a resilient support means inside each drum having a shaft-engaging mat and narrow flexible fingers projecting from said mat into engagement with said drum, and
    means for rotating said shaft.

9. The assist mechanism of claim 8 wherein said resilient support means comprises a flexible said mat having a flat lower surface and a series of projecting fingers comprising said flexible means and a row of openings at one end through which one row of said fingers can be pushed through and locked to hold said mat around said shaft.

10. The pickup of claim 8 having said assist frame means pivotally mounted to said frame and having first stop means supporting said shaft and drums by gravity at a normal operating gap from said elevator means, and second stop means limiting enlargement of the gap.

References Cited

UNITED STATES PATENTS 3,078,926  2/1963  Ries et al. _____ 171—101 XR
3,193,020  7/1965  Button _____ 56—327
3,194,318  7/1965  Boyer _____ 56—121.46 XR ANTONIO F. GUIDA, *Primary Examiner.*

U.S. Cl. X.R.

171—21, 101